United States Patent
Acharya et al.

(10) Patent No.: US 11,558,193 B2
(45) Date of Patent: Jan. 17, 2023

(54) LOCATION-BASED ACCESS TO CONTROLLED ACCESS RESOURCES

(71) Applicant: GOOGLE LLC, Mountain View, CA (US)

(72) Inventors: Anurag Acharya, Palo Alto, CA (US); Samuel Yuan, San Jose, CA (US); Alexandre A. Verstak, Cupertino, CA (US)

(73) Assignee: GOOGLE LLC, Mountain View, CA (US)

( * ) Notice: Subject to any disclaimer, the term of this patent is extended or adjusted under 35 U.S.C. 154(b) by 433 days.

(21) Appl. No.: 16/122,294

(22) Filed: Sep. 5, 2018

(65) Prior Publication Data
US 2020/0052896 A1 Feb. 13, 2020

Related U.S. Application Data

(60) Provisional application No. 62/718,309, filed on Aug. 13, 2018.

(51) Int. Cl.
*H04L 9/32* (2006.01)
*H04L 9/40* (2022.01)

(52) U.S. Cl.
CPC .......... *H04L 9/3213* (2013.01); *H04L 9/3297* (2013.01); *H04L 63/108* (2013.01); *H04L 63/0272* (2013.01)

(58) Field of Classification Search
CPC ... H04L 9/3213; H04L 9/3297; H04L 63/108; H04L 63/0272

(Continued)

(56) References Cited

U.S. PATENT DOCUMENTS 7,900,245 B1 * 3/2011 Geddes ............... H04L 63/0407
  713/159
8,630,620 B2 1/2014 Cha et al.
(Continued)

FOREIGN PATENT DOCUMENTS

CN 101589596 A 11/2009
CN 102933980 A 2/2013
(Continued)

OTHER PUBLICATIONS

"HighWire Press adds CASA to eliminate barriers to off campus and mobile access to subscriptions", HighWire Press, Sep. 13, 2017, 4 pages.

(Continued)

*Primary Examiner* — Kendall Dolly
*Assistant Examiner* — Moeen Khan
(74) *Attorney, Agent, or Firm* — Brake Hughes Bellermann LLP (57) ABSTRACT

Systems and methods provide access to location-restricted resources outside of recognized locations. An example, a method includes receiving a request for a controlled access resource from a client device and determining that the request is not associated with a recognized location but that state data exists for the client device identifier. In response to identifying the state data, the method includes generating a link for accessing the controlled access resource at a server, generating an encrypted token including a timestamp, a random number, and licensed resource information from the state data, including the encrypted token in the link, and providing the link to the client device. The client device uses the link to request the controlled access resource from the server, which determines that the request includes the token, determines that the token is not expired, and provides the controlled access resource to the client device.

22 Claims, 6 Drawing Sheets

(58) Field of Classification Search
USPC .......................................................... 713/155
See application file for complete search history.

(56) References Cited

U.S. PATENT DOCUMENTS

| | | | |
|---|---|---|---|
| 8,948,392 B2 | 2/2015 | Chassagne | |
| 9,256,722 B2 | 2/2016 | Saxman et al. | |
| 9,450,963 B2 | 9/2016 | Srinivasan et al. | |
| 9,582,679 B2 | 2/2017 | Ohtani et al. | |
| 9,854,384 B2 | 12/2017 | Zhang et al. | |
| 9,967,252 B2 | 5/2018 | Shaw et al. | |
| 10,530,782 B2 | 1/2020 | Brockhuus et al. | |
| 2014/0137248 A1* | 5/2014 | Gajda | G06F 21/445 726/23 |
| 2016/0092696 A1* | 3/2016 | Guglani | G06F 21/6245 726/26 |
| 2016/0092869 A1 | 3/2016 | Salama et al. | |
| 2016/0283942 A1* | 9/2016 | Chitragar | G06Q 20/327 |
| 2016/0316365 A1* | 10/2016 | Buhler | H04W 12/06 |
| 2017/0034152 A1* | 2/2017 | Subramanya | H04L 63/0815 |
| 2017/0085563 A1* | 3/2017 | Royyuru | H04L 63/0861 |
| 2017/0223005 A1 | 8/2017 | Birgisson et al. | |
| 2018/0109540 A1 | 4/2018 | Amar et al. | |
| 2018/0332016 A1* | 11/2018 | Pandey | H04L 63/108 |
| 2019/0327223 A1* | 10/2019 | Kumar | H04L 63/0807 |

FOREIGN PATENT DOCUMENTS

| | | | | |
|---|---|---|---|---|
| CN | 105659558 A | 6/2016 | | |
| CN | 107070863 A | 8/2017 | | |
| CN | 107276977 A | 10/2017 | | |
| CN | 107548547 A | 1/2018 | | |
| JP | 2003330961 A | 11/2003 | | |
| JP | 2015201030 A | 11/2015 | | |
| JP | 2016207052 A | 12/2016 | | |
| WO | 2016182555 A1 | 11/2016 | | |
| WO | WO-2016182555 A1 * | 11/2016 | | H04L 63/0807 |

OTHER PUBLICATIONS

Carpenter, et al., "An Introduction to RA21", RA21 Steering Committee, STM The Global Voice of Scholarly Publishing, Nov. 10, 2017, 46 pages.
Phillips, "Campus Activated Subscriber Access For Better Off-Campus And Mobile Access To Full Text", Ex Libris, Oct. 13, 2017, 2 pages.
International Search Report and Written Opinion for Application No. PCT/US2019/042061, dated Sep. 19, 2019, 13 pages.
Communication under Rule 71(3) EPC for European Application No. 19753211.2, dated Oct. 7, 2020, 46 pages.
Office Action with English translation for Israeli Application No. 277361, dated Feb. 15, 2021, 12 pages.
Notice of Acceptance for Australian Application No. 2019322806, dated Dec. 17, 2021, 3 pages.
First Examination Report for Indian Application No. 202027037195, dated Nov. 23, 2021, 6 pages.
Office Action for Canadian Application No. 3,095,637, dated Nov. 1, 2021, 4 pages.
Notice of Allowance for Japanese Application No. 2020-555490, dated Mar. 1, 2022, 3 pages.
Office Action for Chinese Application No. 201980010007.2, with English Translation, dated Jan. 18, 2022, 15 pages.
Office Action for Korean Application No. 10-2020-7030270 with English Translation, dated Jan. 3, 2022, 19 pages.
Luo, Yunfeng, et al., "Anonymous Continuous Authentication Model for Access Control", Computer & Digital Engineering, vol. 43, No. 9, pp. 1640-1643, Sep. 2015.
Notice of Allowance with English translation for Chinese Application No. 201980010007.2, dated Jun. 15, 2022, 6 pages.
Chen, et al., English Abstract of "Survey on the novel access control model of location-based service based on the spatial location of mobile user", Computer Science, No. 10, Oct. 28, 2008, 7 pages.
Jian, et al., English Abstract of "A fine-grained access control model for vector geospatial data", Geography and Geo-Information Science, No. 1, Jan. 15, 2017, 1 page.
Notice of Allowance with English Translation, for Korean Application No. 10-2020-7030270, dated Jul. 29, 2022, 3 pages.

* cited by examiner

LOCATION-BASED ACCESS TO CONTROLLED ACCESS RESOURCES

RELATED APPLICATION

This application is a non-provisional of, and claims priority to, U.S. Provisional Application No. 62/718,309, filed Aug. 13, 2018, titled "Location-Based Access to Controlled Access Resources," the disclosure of which is incorporated herein by reference.

BACKGROUND

Some systems control access to resources based on a recognized location, such as IP addresses (e.g., proxy servers, VPNs, etc.), physical location, etc. For example, a university may have an agreement with a particular publisher that gives anyone using an on-campus computer or an on-campus WiFi network access to some or all of the articles managed by the publisher. As another example, employees may have access to internal company web pages when using enterprise software (e.g., via a VPN or proxy server). Access to these resources is blocked outside of the recognized locations, e.g., for requests associated with IP addresses that do not match the recognized location(s).

SUMMARY

Implementations enable secure, seamless access to controlled access resources outside of the recognized locations, without using personally identifiable information or requiring a login procedure, while still enabling the resource owner/manager to monitor access and deal with potential abuses. Implementations create state data for a client device when the client device accesses a controlled access resource from a recognized location, e.g., using on-campus WiFi or logging in via a Virtual Private Network (VPN). The state data may include a timestamp, a device identifier, and licensed resource information. The licensed resource information can be any information used to identify the resources available to the user via the recognized location. Put another way the licensed resource information represents the resources available to the client based on an affiliation of the client device and the institution associated with the recognized location. The device identifier can be a cookie generated by a server or other computer associated with the recognized location (e.g., the campus or library website or a proxy server) or could be another identifier, such as a mobile number or user account identifier. In some implementations such identifiers may be hashed in the state data record. The state data expires, e.g., after some predetermined time elapses after generation of the state data.

Implementations use the state data to enable the client device to later access a controlled access resources outside of the recognized location. For example, once a student leaves the campus implementations enable the student to access, for a limited time, the resources as-if the student were still on-campus. Thus, implementations provide seamless access. When the system receives a request for a controlled access resource that originates outside of a recognized location, the system checks for unexpired state data for the device. Responsive to location of unexpired state data, the system provides a link, such as a URL, to the controlled access resource with an encrypted token included in the link, e.g., appended to the URL. The resource owner/manager recognizes the presence of the token in the request, unencrypts the token, and performs one or more verification tests using the unencrypted token data. Tests may include whether the token is expired, how many times the token has been presented, and/or whether the token was presented by a client device too far from of a location of the request that generated the token. These tests can discourage access by another client device, e.g., through the sharing of the URLs.

In one general aspect, a method includes receiving a request for a controlled access resource from a client device, the request including a client device identifier, determining that the request is not associated with a recognized location, identifying state data for the client device identifier, generating a link for accessing the controlled access resource at a server, generating an encrypted token, the encrypted token including a timestamp, a random number, and licensed resource information from the state data, including the encrypted token in the link, and providing the link to the client device, the client device using the link to request the controlled access resource.

In one general aspect, a system includes at least one processor, a datastore storing state data records for client devices, and memory storing instructions that, when executed by the at least one processor, cause the system to perform operations. The operations include receiving a query from a client device, the client device having a device identifier, and determining that at least one resource responsive to the query is a controlled access resource. In response to determining that the query is associated with a recognized location for the controlled access resource the operations include generating a link to the controlled access resource and generating a state data record for the client device in the datastore, the state data including the client device identifier, a timestamp, and an association with the recognized location. In response to determining that the query is not associated with a recognized location, the operations include identifying an unexpired state data record in the datastore for the client device identifier and, in response to identifying the unexpired state data record, generating a token and including the token in a link to the controlled access resource, the token including a random number, a timestamp, and licensed resource information from the state data record. In response to failing to identify the state data record in the datastore for the client device identifier, generating a link without the token, and returning a search result for the query to the client device, the search result including the link to the resource, wherein the client device uses the link to the resource to request the resource from a controlled access server, the controlled access server configured to provide access to resources from requests associated with recognized locations.

In one general aspect, a method includes receiving a request for a controlled access resource from a client device, the request having a location, determining that the location is not a recognized location, determining that the request includes a token, the token including a timestamp, a random number, and licensed resource information, determining that the token is not expired based on the timestamp, determining that a resource identified by the licensed resource information matches the requested resource, and providing the controlled access resource to the client device, wherein the client device would otherwise be denied access to the controlled access resource.

In one general aspect, a computer program product embodied on a computer-readable storage device includes instructions that, when executed by at least one processor formed in a substrate, cause a computing device to perform any of the disclosed methods, operations, or processes. Another general aspect includes a system and/or a method for generating and maintaining state data for client devices that triggers generation of limited-use tokens for seamless access of controlled access resources based on location data, substantially as shown in and/or described in connection with at least one of the figures, and as set forth in the claims.

One or more of the implementations of the subject matter described herein can be implemented so as to realize one or more of the following advantages. As one example, implementations protect user privacy because each link for accessing the resource has a unique token lacking personally identifiable information, which prevents network/ISP level monitoring from tying together multiple accesses by a user using the tokens. As another example, recording the licensed resource information (e.g., subscription information, an institution identifier, etc.) rather than the IP address of the client device in the state data and the token avoids recording specific device locations, which further protects user privacy. As another example, some implementations prevent bad actors from discovering the affiliation between a particular user/client device and the institution by encrypting the token. As another example, some implementations prevent bad actors from discovering the affiliation between a particular user/client device and the institution because the state data includes information that identifies a resource or collection of resources rather than a location. As another example, disclosed implementations reduce processing cycles and bandwidth consumption on client devices by eliminating the need for a login procedure for requests made outside the recognized locations. Login procedures consume processing cycles and bandwidth and often must be repeated because of a time-out (e.g., inactivity for a certain period). Decreasing use of bandwidth and processing cycles is especially important in a mobile environment, e.g., where the client device is a mobile phone or tablet, as doing so saves battery life. Elimination of the login procedure also improves the user experience by making access seamless, i.e., the user is not required to setup an additional process or provide additional input to access the controlled resources. Thus, implementations reduce the time and computing resources expended by a user to access the controlled resources outside of recognized locations. Seamless access may also increase the use of (i.e., demand for) the resources, which increases the incentives for institutions and resource owners to offer such services.

The details of one or more implementations are set forth in the accompanying drawings and the description below. Other features will be apparent from the description and drawings, and from the claims.

BRIEF DESCRIPTION OF DRAWINGS

Like reference symbols in the various drawings indicate like elements.

DETAILED DESCRIPTION

FIG. 1 is a block diagram of a controlled access system in accordance with an example implementation. The system 100 may be used to seamlessly enable a client device to access location-based controlled access resources outside of a recognized location for a limited time. The access is seamless because the user of the client device accesses the resources the same way from both a recognized location and from outside the recognized location. In other words, to the user there is no difference between accessing a controlled-access resource from a recognized location and accessing this resource from outside the recognized location, so long as this is done within the limited time period. The access is time-limited to ensure that the user is still affiliated with the recognized location. The system 100 can grant the access without using personally identifiable information, which safeguards user privacy. The system 100 records state data for a device when the device accesses the controlled resources via a recognized location. The state data records information used to identify licensed resources available via an affiliation between the client device and the recognized location. The state data expires after some period of time, e.g., is valid for a limited time. Each time the client device accesses a resource via the recognized location the state data is updated, e.g., a new record written or a record for the client device is updated. If the client device attempts to access a controlled resource outside of the recognized location, the system 100 recognizes the state data date for the client device and uses the licensed resource information in the state data to generate a token, which is passed to the owner of the resource. The owner can recognize the token and allow access to the resource. The token may be valid for a very short period of time to discourage misuse and may be encrypted to ensure privacy and further limit opportunities for abuse. The system 100 in FIG. 1 is illustrated as a system that includes a resource access server 110, and a controlled resource server 180. However, use of a resource access server 110 is not required and functions described as performed by the resource access server 110 may be performed at the controlled resource server 180. Thus, implementations are not limited to the exact configurations illustrated.

The recognized location 160 may be an IP address or a physical location associated with a particular institution, such as a library, an educational institution, a corporation, a hospital, an enterprise system, etc. The institution may offer access to controlled access items via the recognized location 160, e.g., through a subscription agreement, employment agreement, or other contractual arrangement. In some implementations, the institution may be the owner/manager/operator of the controlled resource server 180. For ease of explanation, reference to owner of the controlled resource server 180 as used herein also refers to a manager of the resources and/or the operator of the controlled resource server 180. In some implementations, the institution may have an agreement with the owner of the controlled resource server 180. In either case, the institution may offer users access to the controlled access items via the recognized location 160. The recognized location 160 has associated location information. In some implementations the recognized location information may be an Internet protocol (IP) address or portion thereof. This may be a full IP address, an IP subnet, a domain (e.g., institution.net), a sub-domain (e.g., subscription.institution.net or www.institution.net/subscription), an email domain, etc. In some implementations, the location information may be physical location information. For example the IP address or some portion thereof may map to a physical location. As another example, a browser on the client may include a geolocation API and this information may be used as the location information. Other similar types of information may be used for location information used to identify the recognized location 160.

Figure 4:
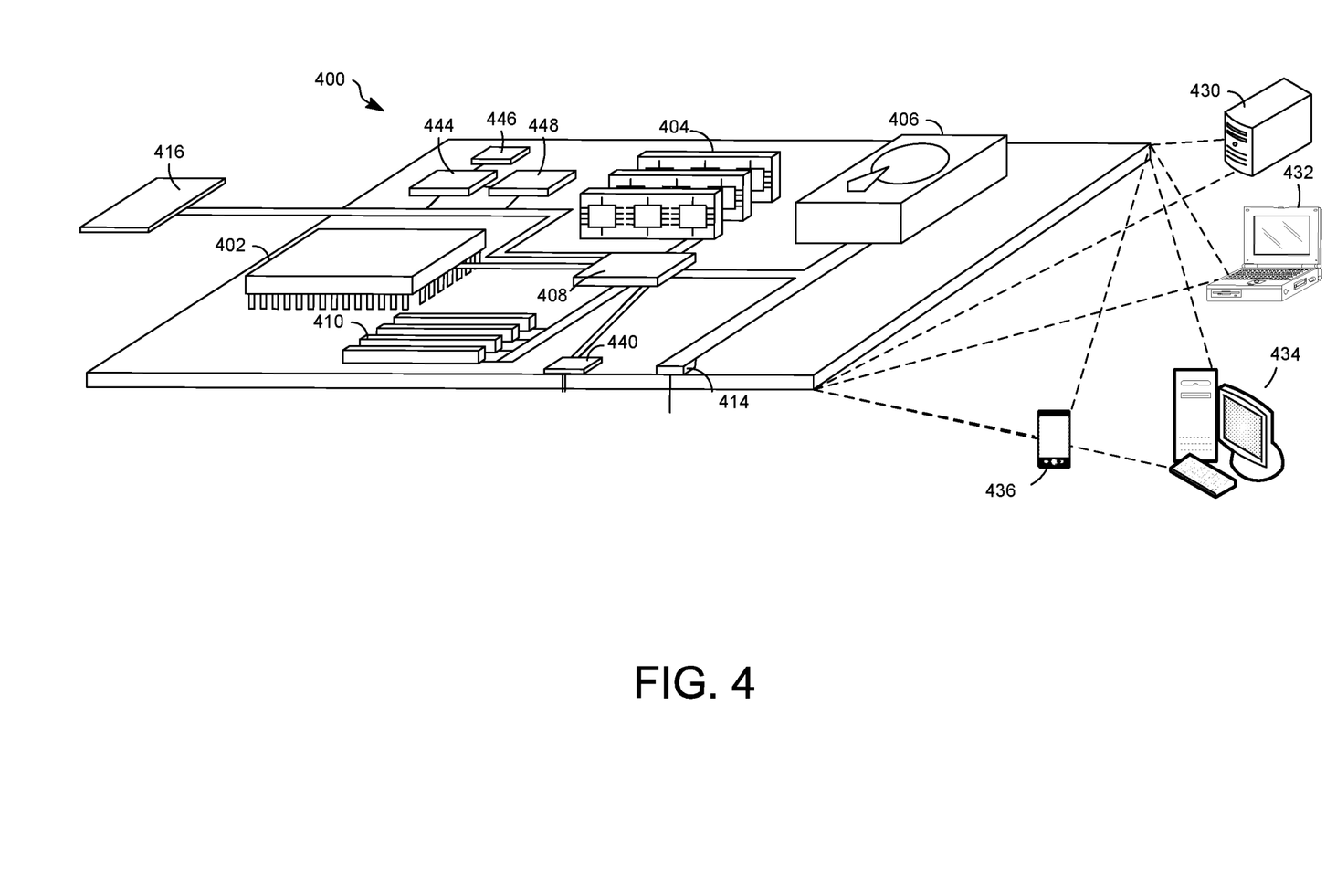
FIG. 4 shows an example of a computer device that can be used to implement the described techniques.
Figure 5:
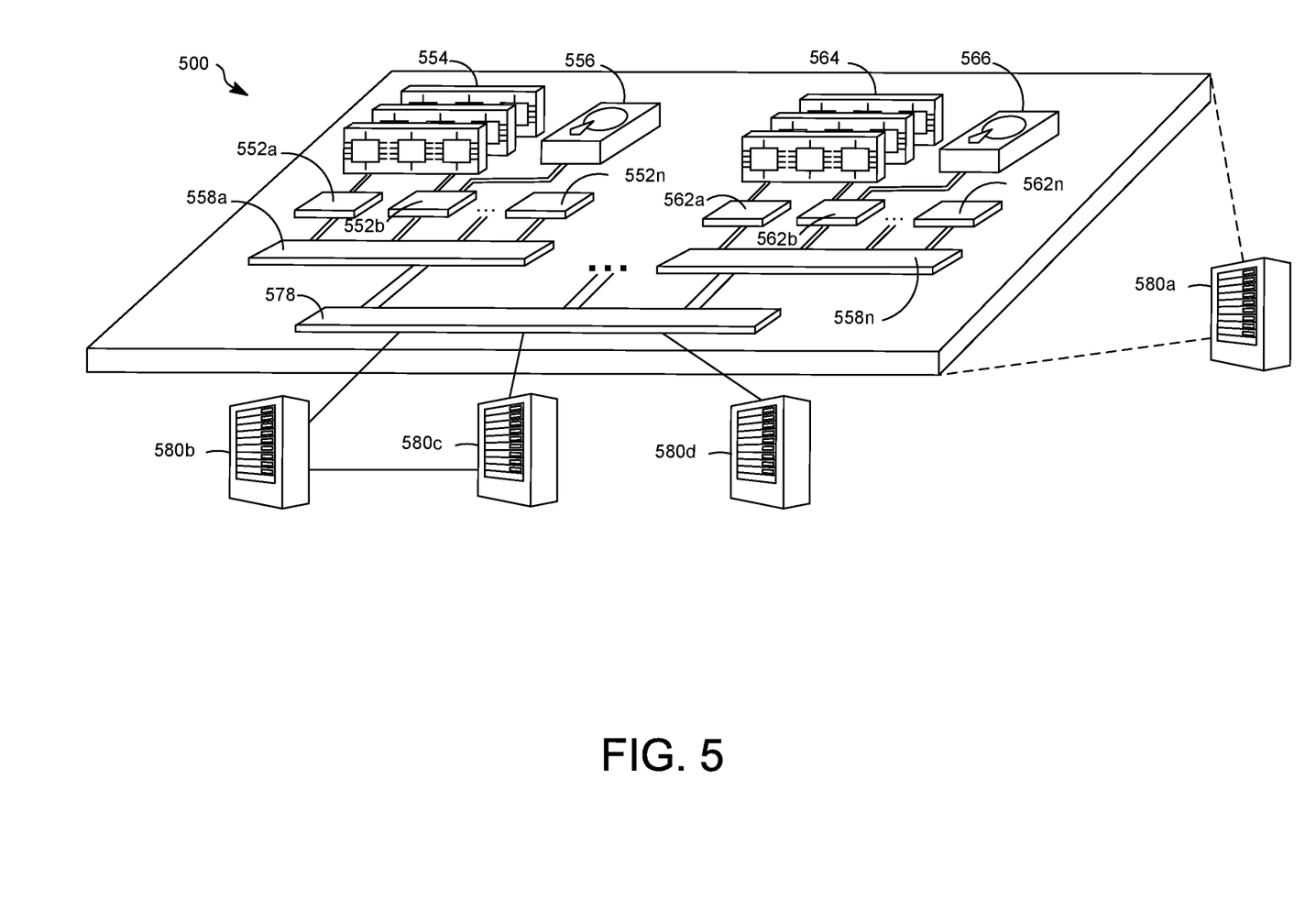
FIG. 5 shows an example of a distributed computer device that can be used to implement the described techniques.

The controlled access system 100 may include a resource access server 110, which may be a computing device or devices that take the form of a number of different devices, for example a standard server, a group of such servers, or a rack server system. For example, resource access server 110 may be implemented in a distributed manner across multiple computing devices. In addition, server 110 may be implemented in a personal computer, or distributed across several personal computers. The resource access server 110 may be an example of computer device 400, as depicted in FIG. 4, or computer device 500, as depicted in FIG. 5. Resource access server 110 may include one or more processors formed in a substrate configured to execute one or more machine executable instructions or pieces of software, firmware, or a combination thereof. The processors can be semiconductor-based—that is, the processors can include semiconductor material that can perform digital logic.

The resource access server 110 can also include one or more computer memories. The memories, for example, a main memory, may be configured to store one or more pieces of data, either temporarily, permanently, semi-permanently, or a combination thereof. The memories may include any type of storage device that stores information in a format that can be read and/or executed by the one or more processors. The memories may include volatile memory, non-volatile memory, or a combination thereof, and store modules or engines that, when executed by the one or more processors, perform certain operations. In some implementations, the modules may be stored in an external storage device and loaded into the memory of server 110. In some implementations, the modules may include access engine 120 and verification engine 122. The access engine 120 represents a web site or portal used to search for and provide access to various resources. In some implementations, the access engine 120 may be a search engine and may use an index 112 to provide search results in response to queries. The index 112 may be any type of index used to find resources responsive to a query. The index 112 may include resources from several different servers, e.g., resources available over the Internet. The index 112 may include resources from a plurality (not shown) of controlled resource servers 180. The index 112 may include resources from a plurality of controlled resource servers 180 and other servers (not shown) having resources that are not controlled. In some implementations, the index 112 may be an index of one or more resources available via the Internet. In some implementations, the index 112 may be an index of resources offered via an intranet. In some implementations, the index 112 may be an index of one or more particular categories of resources, e.g., e-books, songs, videos, scholarly articles, white papers, etc. The index 112 may be stored in the memory of the resource access server 110. The index 112 may be distributed over memory in a plurality of computing devices, which collectively are considered the resource access server 110. All or part of the index 112 may be stored in a memory separate from but accessible to the resource access server 110.

The resource access server 110 may also include access database 116. The access database 116 may be stored in the memory of the resource access server 110. The access database 116 may be stored in a memory accessible to the resource access server 110. The access database 116 may include information indicating which locations are recognized for a particular controlled access resource and/or a particular controlled resource server. For example, the access database 116 may indicate, for each controlled access resource, which locations are recognized. As another example, the access database 116 may indicate, for each location, which controlled access resources the location may access. As another example, the access database 116 may indicate for a category of controlled access resources which locations are recognized locations. As another example, the access database 116 may include information indicating which locations are recognized for a particular controlled resource server 180. For example, the access database 116 may indicate, for each controlled resource server 180, the locations that are recognized locations for that server, which grants access to all controlled access resources at the server 180. Other similar combinations are possible. In some implementations, the access database 116 is incorporated into the index 112. For example, for each resource in the index, the index entry may include an association with locations considered recognized locations for that resource. In some implementations, if a resource is determined to be responsive to a query the resource access server 110 includes the resource (i.e., a URL or other link to the resource) in a search result when the query is associated with and/or came from a recognized location for that resource. In some implementations, the resource access server 110 includes one link for the resources when the request is associated with (e.g., came from) a recognized location and a different link when the request is not associated with a recognized location.

The verification engine 122 may apply the access database 116 to the index 112 in responding to a query. For example, the verification engine 122 may determine whether a query originates from, is associated with, or is unrelated to a recognized location. When the query originates from a recognized location for a controlled access resource that is responsive to the query, the access engine 120 may generate a link to the controlled access resource to be included in the search result. When the query is associated with, but does not originate from, a recognized location, the access engine 120 may generate an encrypted token and include the encrypted token with the link in the search result. In some implementations, the encrypted token may be appended to the link. In some implementations, the encrypted token may be inserted into the link. In some implementations, the link with the encrypted token is, outside of the inclusion of the encrypted token, the same as the link for a request originating from the recognized location. The verification engine 122 may encrypt the token using an encryption key 118. The encryption key 118 is shared with the controlled resource server 180, so that the controlled resource server 180 can accept and verify links that include the encrypted token. The verification engine 122 may use state data 114 to determine whether a query that does not originate from a recognized location is associated with a recognized location.

The state data 114 is information recording an affiliation between a particular client device and a recognized location as licensed resource information. The verification engine 122 may write state data 114 for a client device 170 when the client device 170 accesses the resource access server 110 via the recognized location 160. For example, a student may use the WiFi of a university (the recognized location 160) to send a query to the resource access server 110. The resource access server 110 can recognize that the query originates from the WiFi IP address, which is one of the recognized locations in the access database 116. In response to recognizing that the query is made via the recognized location (e.g., the university WiFi), the access engine 120 may record the association between the mobile phone and the WiFi IP address in state data 114. The state data 114 may be stored in any type of memory at the resource access server 110. The state data 114 may be stored in a memory accessible to the resource access server 110. The state data 114 stores, for a particular client device 170, one or more licensed resource identifiers. The licensed resource identifiers represent an association between the client device 170 and the list of resources (e.g., one or more resources) that the client device 170 has access to based on an affiliation with the institution.

Figure 2:
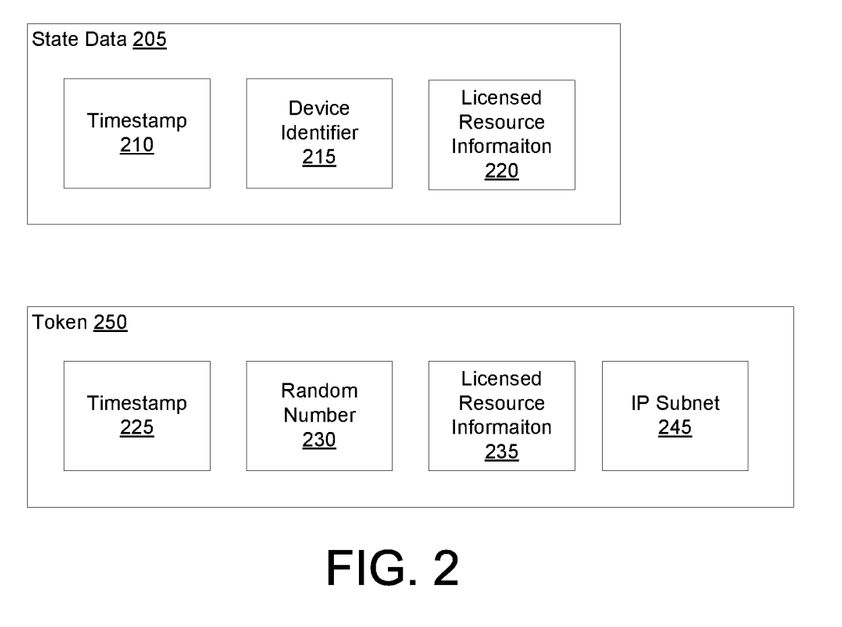
FIG. 2 illustrates example data structures used in accordance with the disclosed subject matter.

FIG. 2 illustrates an example data structure used to store state data. The state data 205 data structure is an example of a record in state data 114. In the example of FIG. 2, state data 205 includes a timestamp 210. The timestamp 210 is used to enforce a time limit for the affiliation. The state data 205 can be valid for some set time period (e.g., 30 days, 7 days, 1 day, etc.) The time limit can be dictated contractually, e.g., by the institution associated with the recognized location, by the owner of the controlled access resources, or a combination of these. For example, a particular university may require that students refresh the state data at least weekly or monthly, e.g., by visiting campus and using the campus WiFi with their device. The timestamp 210 can be the time at which the state data expires. The timestamp 210 can be the time the state data was generated and/or updated and the state data 205 expires after some predetermined time elapses. The state data 205 also includes a device identifier 215. The device identifier 215 identifies a client device, e.g., client device 170, making the request. In some implementations, the device identifier 215 may be a value from a cookie. The cookie may be provided to the client device 170 by the institution using conventional methods. In some implementations, the device identifier 215 may be a user account. In such implementations, the state data 205 may be considered an attribute of the user account. The device identifier 215 can be any information used to uniquely identify the client device. The state data 205 may also include licensed resource information 220. Licensed resource information 220 is used to identify the resources available to the client device, e.g., based on the client device making a request via the recognized location. For example, the licensed resource information 220 may be an IP address, e.g., for campus WiFi, a domain of a library website, a company proxy, or a subscriber identifier for the recognized location, or a location code, etc.

The resource access server 110 may generate or update the state data for a client device each time the resource access server 110 receives a request from the client device via the recognized location. Generating the state data includes writing a new record for the client device and the recognized location. Updating the state data includes updating the timestamp of an existing record in the state data 114 for the client device and recognized location. The expiration of the state data 114 ensures that the access to the resources outside the recognized location is granted to those who have an active, ongoing affiliation with the recognized location. In some implementations, the state data 114 may be stored with the cookie information at the server. In some implementations, the state data 114 may be associated with a user account. For example, a user may have an account with the resource access server 110 and the state data may be associated with the user account. For example, a user may be logged into their account at the resource access server 110 while using a library portal at the library. In some implementations, the association with the library's recognized location may be stored as part of the user's account. In some implementations, the association between the library's rec-ognized location and the user's account is recorded in a separate datastore at the resource access server.

If a controlled access resource is responsive to a query that does not originate from a recognized location but that is associated with unexpired state data, the access engine 120 may generate a token for the resource. In some implementations, each resource has a respective token. FIG. 2 illustrates an example token 250. The token 250 includes a timestamp 225. The timestamp 225 may represent the time the token was generated or the timestamp 255 may represent the time at which the token expires. In either case, the system can verify that the token has not expired using the timestamp 225. The window for which the token is valid may be small, e.g., an hour or a few hours. The token 250 may also include a random number 230. The random number ensures the token is unique. Uniqueness enables a verification engine 186 of a controlled resource server 180 to ensure that the token is not used too many times. In some implementations, the tokens are intended for limited use, e.g., for a particular resource identified by a URL, and may only be valid for an hour or so. While a limited number of accesses may be allowed, e.g., via a browser "back" button or "forward" button, without generating a new token, too many accesses may be an indication of sharing of the link. The random number 230 may be of a size suitable for the environment to ensure uniqueness. In some implementations this may be a 64-bit number, but can be larger or smaller depending on the implementation environment. The token 250 may also include licensed resource information 235. The licensed resource information 235 is used to identify resources available to the client device. The licensed resource information 235 may include an identifier for the recognized location. The licensed resource information 235 may include an identifier for a resource. The licensed resource information 235 may include a collection identifier for a collection of resources available from the controlled resource server. The licensed resource information 235 may include a physical location identifier. The licensed resource information 235 is any information that enables the controlled resource server 180 to determine whether the requestor has access to the requested resource or not, as is done for a request from a recognized location. In some implementations the licensed resource information may be optional, e.g., if another server or process has already verified the requestor has access prior to generating the URL and/or the token. The token 250 may also include the IP subnet 245 of the client device that triggered generation of the token. The IP subnet 245 enables the controlled resource server 180 to identify abuse. For example, the IP subnet 245 may allow a user travelling in a subway to access a resource after switching to a different cell tower, but will not allow access to the resource if the device travels outside the IP subnet. This, along with the expiration of the token and allowing presentation a few times but not more than some threshold number, prevents distribution of the token to others.

Once generated, each token may be encrypted using encryption key 118, and included in a link (e.g., URL) for the responsive controlled access resource. The link enables the query requestor, e.g., the user of the client device 170, to request the resource from the controlled resource server 180.

The controlled access system 100 may include controlled resource server 180, which may also be a computing device or devices that take the form of a number of different devices, for example a standard server, a group of such servers, or a rack server system. For example, controlled resource server 180 may be implemented in a distributed manner across multiple computing devices, in a personal computer, or distributed across multiple personal computing devices. The controlled resource server 180 may be an example of computer device 400, as depicted in FIG. 4, or computer device 500, as depicted in FIG. 5. Controlled resource server 180 may include one or more processors formed in a substrate configured to execute one or more machine executable instructions or pieces of software, firmware, or a combination thereof. The processors can be semiconductor-base—that is, the processors can include semiconductor material that can perform digital logic.

The controlled resource server 180 may include one or more computer memories. The memories, for example, a main memory, cache memory, disk memory, etc., may be configured to store one or more pieces of data, either temporarily, permanently, semi-permanently, or a combination thereof. The memories may include any type of storage device that stores information in a format that can be read and/or executed by the one or more processors. The memories may include volatile memory, non-volatile memory, or a combination thereof, and store data and/or modules or engines that, when executed by the one or more processors, perform certain operations. In some implementations, the data and/or modules may be stored in an external storage device and loaded into the memory of controlled resource server 180. The controlled resource server 180 may include controlled access resources 182, which are stored in the one or more memories. Controlled access resources 182 may be a repository of any kind of resource, e.g., a document, an audio file (e.g., music or audio book), a video file, an image, a web page, an application or other executable file, products, etc., or a collection of any of these, such as an album of songs, a catalog of products, or a journal of articles. In some implementations the controlled access resources 182 may be distributed across multiple computing devices.

The controlled resource server 180 may include a verification engine 186 stored as a module in one or more of the memories. The verification engine 186 controls access to the controlled access resources 182. For example, the verification engine 186 may provide the controlled access resources 182 in the response to requests from recognized locations. A recognized location is any information recognized by the controlled resource server 180 as having access to one or more of the controlled access resources 182. A location may be recognized because an institution has an agreement (e.g., license, subscription) with the owner or operator of the controlled resource server 180. For example, a university may have a subscription from a publisher for access to certain journals, journal articles, books, etc. The publisher may recognize requests coming from on-campus IP addresses as coming from a recognized location. As another example, a library may have an agreement with an audio book provider or other publisher for access to certain audio book titles or e-books. The audio book provider may recognize requests originating from the library's domain as a recognized location. As another example, a corporation may grant access to certain web pages or internal documents to employees who use a particular virtual private network (VPN), enterprise server, or proxy server. The corporation may recognize requests coming from the VPN as coming from a recognized location. In another example, a company may grant access to an outsourced service, such as a Customer Relation Management system (CRM, a pending task/ticket management system, an inventory management system, etc., based on a request coming from a proxy server. This list is not exhaustive and intended to be non-limiting examples only.

The verification engine 186 may perform a series of tests on an incoming request for a resource. One test may be whether the recognized location has access to the requested resource. As indicated above, not all resources in the controlled access resources 182 may be available to a particular recognized location. In such implementations, the verification engine 186 may deny access to a request in response to determining that the requested resource is not accessible from the recognized location. In some implementations, the verification engine 186 may determine whether or not the request is from a recognized location. If the request is from a recognized location, in some implementations, the verification engine 186 may provide the requested resource from the controlled access resources 182 to the requestor. The requested resource is the resource identified by the link, e.g., the URL. In some implementations, the controlled resource server 180 may perform additional verifications, e.g., monitoring for spiky or abusive behavior using known processes.

If the request is not from a recognized location, the verification engine 186 may determine whether the request includes a token. The token may be encrypted and is used by the system to provide access, for a limited time, to the controlled access resources 182 as-if the request came from a recognized location. The verification engine 186 may decrypt the token using encryption key 188. The encryption key 188 is shared between the controlled resource server 180 and the server that tracks and maintains the state data for the client device, e.g., resource access server 110. As discussed above with regard to token 250, the token may include data that the verification engine 186 uses to perform additional validation of the request. If a request with a token passes the validation requests, the verification engine 186 provides the requested resource, just as-if the request came from a recognized location.

The controlled access system 100 may include a client device 170. Client device 170 may be any computing device belonging to a user, such as a smartphone or other handheld computing device, a tablet, a wearable computing device, a laptop computer, a netbook, an e-reader, a personal computer, a smart speaker, a television with a processor, etc., that is capable of requesting resources via recognized location 160 as well as via other locations. Client device 170 may be an example of computer device 400 or 450, as depicted in FIG. 4.

Client device 170 may include one or more processors formed in a substrate configured to execute one or more machine executable instructions or pieces of software, firmware, or a combination thereof. The processors can be semiconductor-based—that is, the processors can include semiconductor material that can perform digital logic. The client device 170 may thus include one or more computer memories configured to store one or more pieces of data, either temporarily, permanently, semi-permanently, or a combination thereof. The client device 170 may be associated with an identifier 175. The identifier 175 may be provided by, e.g., via a cookie, resource access server 110. The identifier 175 may be a user identifier, e.g., a unique username, for a user account. The client device 170 may include applications (not shown), such as a browser, which represent machine executable instructions in the form of software, firmware, or a combination thereof. The client device 170 may request and access the resources using the applications. In some implementations, the applications may be mobile applications.

The client device 170, the resource access server 110, and/or the controlled resource server 180 may be in communication with each other and with other client devices and servers over one or more networks. The networks (not shown) may be for example, the Internet, a wired or wireless local area network (LAN), a WiFi connection, an Ethernet connection, a wide area network (WAN), a cellular data network and/or a communications network, etc., implemented using, for example, gateway devices, bridges, switches, cables, routers, and/or so forth.

Figure 1A:
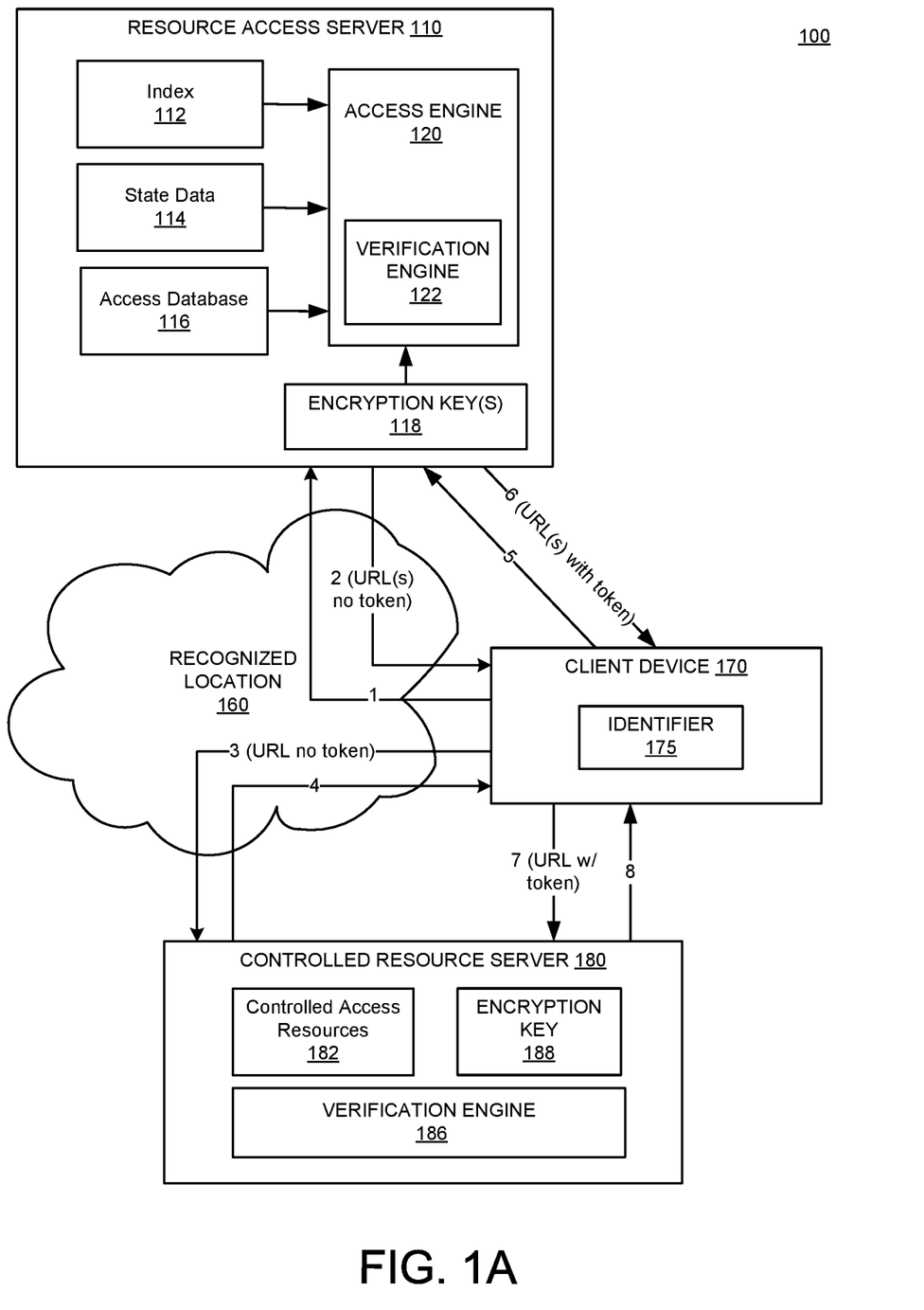
FIGS. 1A and 1B are a block diagrams illustrating example systems in accordance with the disclosed subject matter.

In the example of FIG. 1A, the client device 170 connects to the resource access server 110 via a recognized location 160. The connection may be a WiFi, Ethernet, Intranet, or other similar type of connection. The connection may also be a VPN or Internet connection, e.g., via a login. The client device 170 requests a resource (e.g., arrow 1) via the recognized location 160. The resource access server 110 represents a common access portal, such as a search engine website, a library portal, a hospital portal, etc. The request (e.g., arrow 1) may be in the form of a general query or query for a specific resource. The resource access server 110 generates a response (e.g., arrow 2) that includes one or more links to resources responsive to the query. If the request is a general query, the resource access server 110 may provide links to the responsive resources, which may include one or more controlled access resources. If the request is for a specific resource, the response may be a single link to the resource. The resource access server 110 also generates state data for the client device 170, recording the association between the client device 170 and the recognized location. The response (e.g., arrow 2) is thus a link, e.g., URL, to the controlled access resource (or URLs to two or more resources responsive to a general query). Because this request was made via a recognized location, the link can be a traditional link, e.g., without the token. The search results may be displayed to the user of the client device (not shown) and the user may request a specific resource by selecting a link for one of the controlled access resources (e.g., arrow 3). The request is made via recognized location 160 to the controlled resource server 180. The controlled resource server 180 recognizes the request as coming from a recognized location (e.g., arrow 3), and (subject to verifying licensed resource information) provides the resource to the client device 170 via the recognized location 160 (e.g., arrow 4).

Later, the client device 170 may make another request for controlled access resources (e.g., arrow 5) outside of the recognized location 160. For example, a library patron may be at home requesting access to an audio book from the common access portal. The request could also be in the form of a query. The resource access server 110 may determine that the resource is a controlled access resource and that the request is outside of a recognized location for the resource. In response, the resource access server 110 may locate the state data for client device 170 and, in response, generate an encrypted token and include the encrypted token in a link to the resource to the client device (e.g., arrow 6). The client device 170 can use the link to request the resource from the controlled resource server 180 (e.g., arrow 7). The controlled resource server 180 may identify the token in the link and, subject to information in the token passing additional checks, provide access to the resource (e.g., arrow 8) to the client device 170. If the resource access server 110 fails to identify unexpired state data for the client device 170, the token is not generated and client device 170 would not be able to successfully request the resource from controlled resource server 180. Similarly, if the information in the token does not pass additional checks, the resource may not be provided by the controlled resource server 180.

The controlled access system 100 represents one example configuration and implementations may incorporate other configurations. For example, some implementations may combine one or more of the components of the resource access server 110, and the controlled resource server 180, or may combine one or more components of the access engine 120, the verification engine 122, and the verification engine 186 into a single module or engine. Similarly, in some implementations the index 112, the state data 114, the access database 116, and/or the controlled access resources 182 may be combined into a single datastore, may be distributed across multiple computing devices, or may be stored at another accessible computing device.

Figure 1B:
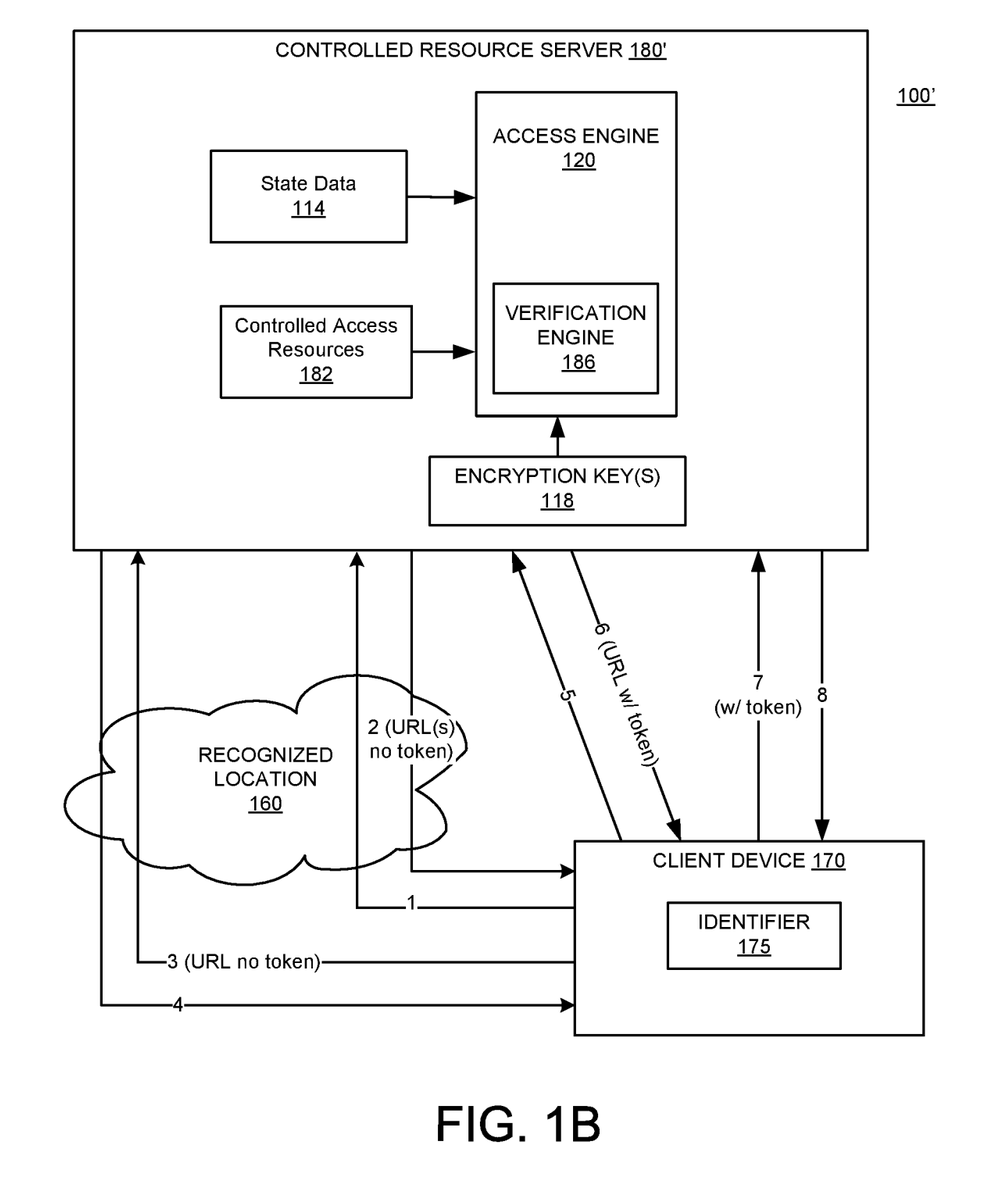

FIG. 1B is another example of an alternate configuration 100' of system 100. In the example of system 100', the controlled resource server 180' includes functions described above with regard to the resource access server 110. In other words, the controlled resource server 180' may include the state data 114 and the access engine 120 and the verification engine 186 may include functions described as performed by verification engine 122. In this example, the client device 170 requests resources via the recognized location 160 from the controlled resource server 180' (e.g., arrow 1). Because the location is recognized, the controlled resource server 180' provides a link to the requested resource (e.g., arrow 2), but also generates state data 114 for the client device 170, e.g., recording information used to identify resources available to the client due to the affiliation with the recognized location as described herein. The link to the resource is provided to the client device 170. The user of client device 170 may select the link (e.g., arrow 3) and access the resource via the recognized location 160, e.g., the resource is provided to the client device 170 via the recognized location 160 (arrow 4). Later, the client device 170 may request a resource from the controlled resource server 180' via a location outside of the recognized location 160 (e.g., arrow 5). Responsive to the controlled resource server 180' determining the request is not via a recognized location and identifying unexpired state data 114 for the client device 170, the controlled resource server 180' may provide a link to the resource (arrow 6). The link can be a single link or can be multiple links included in a search result. The user of the client device 170 can select the link, which includes the token, which sends a request for the resource to the controlled resource server (arrow 7). If the information in the token passes additional verification tests, the resource is provided to the client device 170 (arrow 8). In some implementations, because controlled resource server 180' maintains the state data 114 the use of a token is optional, and the controlled resource server 180' may perform the token verification tests described herein based on the state data 114. FIGS. 1A and 1B are used as examples only and implementations include other configurations.

Figure 3:
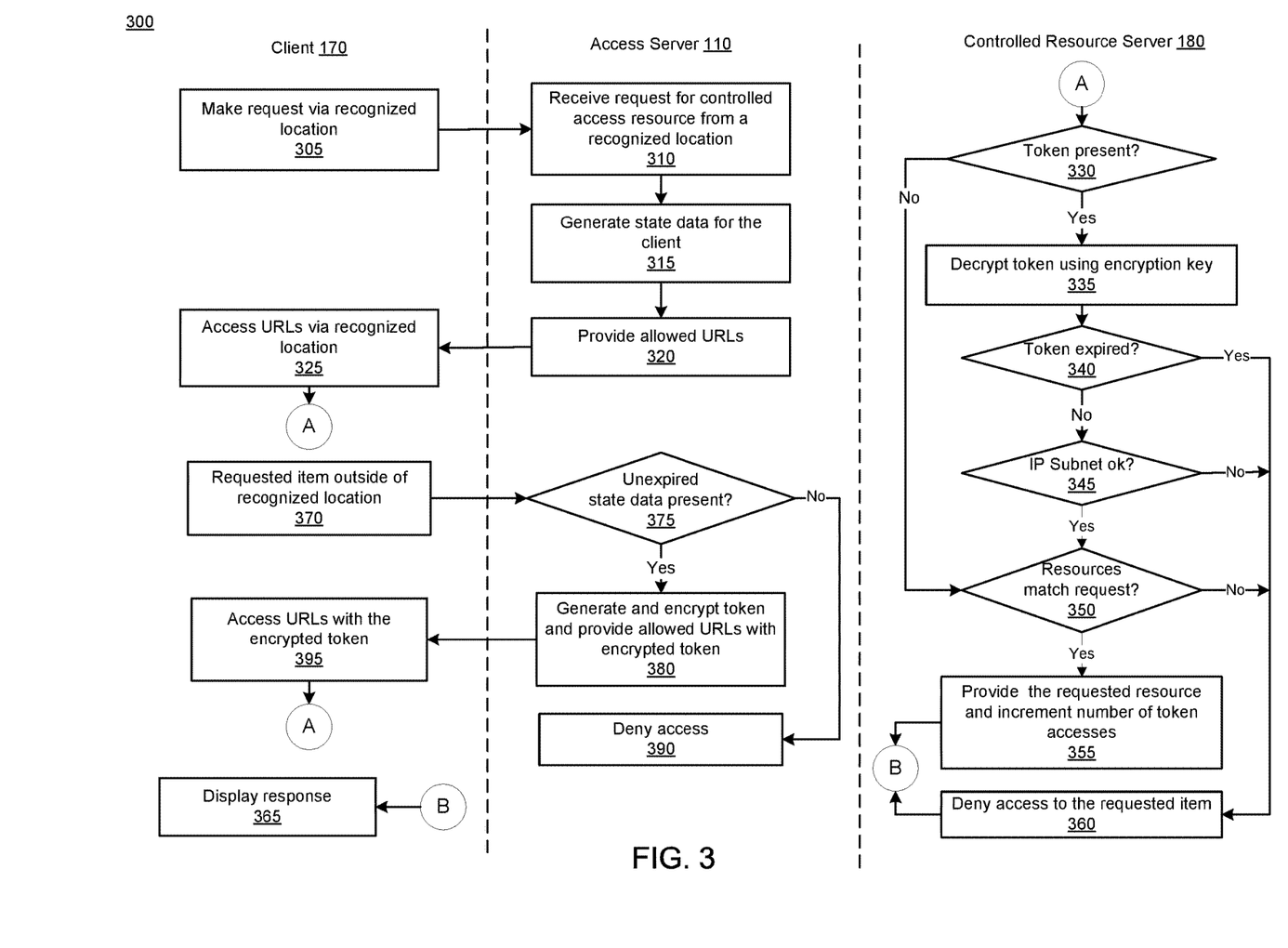
FIG. 3 illustrates a flow diagram of an example process for accessing controlled resources outside of recognized locations, in accordance with disclosed implementations.

FIG. 3 illustrates a flow diagram of an example process 300 for accessing controlled resources outside of recognized locations, in accordance with disclosed implementations. Process 300 may be performed by a controlled access system, such as system 100 of FIG. 1A or FIG. 100' of FIG. 1B. Process 300 may be used to generate state data for a plurality of client devices accessing controlled resources from recognized locations and to use the state data to generate temporary, encrypted tokens for accessing the controlled resources outside of the recognized location under certain circumstances. Process 300 may be implemented with no impact on the users of the client devices. In other words, the users of the client devices need not perform any extra steps or provide any additional input to access the resources from outside the recognized locations. This improves the user experience and conserves resources on client devices. Process 300 may begin with a request for a resource that is made via a recognized location (305). For example, a client device, e.g., client device 170 of FIG. 1A, may be sending requests using a proxy, a secured connection (e.g., VPN), or an Ethernet or WiFi connection, a physical location identified by a browser geolocation API, etc., that is a recognized location, i.e., a location recognized as having access to certain resources. As another example, the client device may be In some implementations, this request may be received by the resource access server, e.g., a search engine, resource portal, or other resource access site (310). The access server determines that the request is for a controlled access resource and comes from a recognized location, e.g., using one or more data stores. In some implementations, the request may be a query and the resource may be responsive to the query. The access server generates state data for the client (315) using a client identifier received with the request. For example, the request may include a cookie value for the device. As another example, the request may include a number unique to the device, such as a phone number. As another example, the request may be made from a device associated with a user account (e.g. a social media account) recognized by the access server. In other words, the user may be logged into the account on the device, and the access server may recognize the logged-in status. The user account, e.g., username, is also considered a device identifier. The state data generated for the client device includes the device identifier, a timestamp, and licensed resource information. In some implementations the device identifier in the state data may be hashed. The licensed resource information is any information that represents the resources to which the client device has access, e.g., based on affiliation between the user of the client device and the recognized location. Non-limiting examples include a resource collection identifier, an IP address of the recognized location, an institution code associated with the recognized location, subscription information, etc. Generating the state data may include updating the timestamp of an existing state data record for the client device and licensed resource information. Generating the state data may include writing a new state data record for the client device. The state data record expires based on the timestamp. Thus, access outside of the recognized location is temporary. The length of the time period for which the state data is active (i.e., unexpired) may be based on a contractual agreement with an owner of the controlled resources and/or the institution associated with the recognized location. The length of the time period may be a few days, a week, two weeks, a month, etc. In order to keep access outside the recognized location seamless, the client device can access the resources via the recognized location before the state data expires. For example, if state data expires after two weeks, a student may visit campus before the end of the two week period and use the campus WiFi to access the resources. Doing so re-starts the two week period. The expiration ensures that the user of the client device maintains an active association with the institution represented by the recognized location.

The resource access server 110 generates a response to the request that includes a link to a controlled access resource (320). If the request is a general query, generating the response may include determining which resources are responsive to the query and, of those responsive resources, generating a respective link for a responsive resource accessible via the recognized location. Thus the links may be provided as part of a search result. The link to the requested resource may also be provided individually. The link may be provided via the recognized location to the client device and the user of the client device may select a link to access the resource (325). The request to access the resource via the link may be handled by the controlled resource server, e.g., at 330. The order of the tests performed by the controlled resource server as depicted in FIG. 3 are provided as one example and implementations are not limited to the sequence of tests depicted in FIG. 3. The controlled resource server may determine whether the request includes a token (330). Put another way, the controlled resource server may look in the URL for the token. If the token is not found (330, No), the controlled resource server may determine whether the requestor has access to the requested resource (350). For a request that does not include the token, the controlled access server may use the location from which the request originates to determine whether the requestor has access to the requested resource. In some implementations, the location may be an IP address or domain. In some implementations, the location may be a combination of a location, such as an IP address or domain, and the requested resource. In some implementations, the location may be an identifier for the recognized location. Put another way, the controlled resource server 180 may use a database to determine whether the requested resource is accessible to the location associated with the request. For example, a publisher may have separate agreements with separate institutions about resources to which the particular institution has access. A university in New York may have access to medical journals while a university in New Mexico may have access to engineering journals. Thus, not all locations may be a recognized location for all resources at the controlled resource server. Accordingly the controlled resource server may determine whether the location of the request is a recognized location for the particular resource being requested. The controlled resource server may also perform other tests, such as determining the number of requests from the particular location as part of determining whether the location is recognized.

If the requestor has access to the requested resource (350, Yes), the controlled resource server provides the requested resources to the requestor (355). The client device receives access to the resource (365) via the recognized location. If the requestor does not have access to the requested resource (350, No), the controlled resource server denies access to the requested item (360). This may include providing an error message, providing a summary of the resource with a link to purchase access, etc. The client device receives the denial (365) via the recognized location.

The client device may also request access to a controlled access resource from outside a recognized location (370). The request may be in the form of a query to the access server. The access server may determine whether the client device has unexpired, i.e., active, state data (375). The state data is generated when the client device accesses the access server via a recognized location, e.g., at 315. A recognized location in this sense is any location recognized by the controlled resource server, regardless of a particular resource. State data is unexpired if the expiration time period has not elapsed since generation of the state data. The state data includes a timestamp set when the state data is generated. The timestamp may represent a time at which the state data expires. The timestamp may represent the time at which the state data was generated and the state data expires after the expiration period. As indicated above, the expiration period is fixed ahead of time, but can vary by institution or controlled resource owner. If state data for the client device cannot be found, or has expired (375, No), the access server may deny access to the resource (390). Denying access may include not providing a link to the resource in a search result even if the resource is responsive to the query. Denying access may include providing the link to the resource in response but without a token. This in effect denies access as the controlled resource server will determine that the request is not from a recognized location. Denying access may include providing some other link, for example a search result with a snippet and a link to process that enables the user to subscribe to purchase access to the resource.

If the state data for the client device exists and is not expired (375, Yes), the access server generates a token for the resource (380). The token includes data from which the controlled resource server can verify the request as associated with a recognized location. In some implementations, e.g., where the request is a query, the access server may generate a token for each controlled access resource that is responsive to the query. In some implementations, the token may be encrypted to deter bad actors. The token includes a timestamp. The timestamp ensures that the token is valid for a short period. The short period can accommodate the client device re-requesting a resource, e.g., using a "back" or "forward" button on a browser. The short period is typically much shorter than the expiration time period for state data. For example, the period for which a token is valid may be an hour or less. This time period may be set by the owner of the resources. As with the state data, the timestamp of the token may be the time at which the token is generated or may be a time at which the token expires, depending on the implementation. The token also includes a random number. The random number ensures the uniqueness of the token. The random number may thus be long enough to ensure uniqueness. For example, the random number may be 64 bits. The token may also include licensed resource information. The licensed resource information is information that the controlled resource server uses to determine which resources the client device has access to. This may be a key to an access or subscription database, may be a key-value pair, may be an identifier for the recognized location, etc. In some implementations, the token may also include an IP subnet used by the client device at the generation of the token. The IP subnet can be used to identify fraudulent (e.g., shared, copied) requests, as explained in more detail herein. In some implementations, the token may be encrypted. The encryption key may be a key known by or shared with the controlled access server. Encryption of the token limits the opportunity for abuse, e.g., spoofing of a token. The token, e.g., the encrypted token, is included in a link for the respective resource and provided to the client device. The client device can then use the link with the token to access the resource (395) from outside of a recognized location.

The controlled resource server receives the request via the URL with the token, recognizes the token (330, Yes) and decrypts the token using the encryption key (335). The controlled resource server performs a series of checks, or tests, on the data from the token. For example, the controlled resource server may determine whether the token has expired (340). As indicated above, the token may be valid for a short period, e.g., an hour. The short time period discourages and limits the opportunities for abuse, e.g., sharing of the link with others. The token may also be considered expired if the token has been seen too many times. The random number makes the token unique. In some implementations, the controlled resource server may count the number of times a token is presented. If the token is presented too many times the token may be considered expired. This type of expiration also limit opportunities for abuse. The number of times a token may be presented may be small, e.g., three or four, which allows for users using the "back" and "forward" functions in a browser a limited number of times. Tokens presented more than this number of times may be denied, e.g., considered expired. If the token has expired (340, Yes), the controlled resource server denies access to the requested item (360). For example, at 365 a message may be displayed indicating the resource must be accessed via a recognized location or a message may be displayed with a link for purchasing access, with a link to a login screen, etc.

If the token has not expired (340, No), the controlled resource server may determine whether the IP subnet of the token matches the IP subnet of the IP address from which the request was received (345). This test occurs if the token includes IP subnet information. This test limits opportunities for abuse by limiting token distribution while allowing a valid user to switch to a different cell tower or WiFi router in the same area. However, if a link is shared, requests using the link that come from IP addresses outside the IP subnet are blocked. Thus, if the IP subnet of the token does not match the IP subnet of the request (345, No), the controlled resource server denies access to the resource (360). If the IP subnets do match, or if the token lacks the IP subnet data, the controlled resource server may determine whether the requestor has access to the requested resource (350). For links with a token, the controlled access server may use the licensed resource information in the token for this test. The licensed resource information in the token is taken from the state data for the client device, and can be any information that the controlled resource server uses to recognize the client device as affiliated with a recognized location, e.g., that identifies a resource, a collection of resources, a subscription to such a collection, etc. available due to affiliation with a recognized location. The controlled resource server uses the licensed resource information in the token to determine whether the requestor has access to the requested resource. If the licensed resource information does not match the requested resource (350, No), the system denies access to the resource (360). If the licensed resource information does match the requested resource (350, Yes), the system provides the requested resource as described above and may increment the number of token accesses (355). Tracking the token accesses enables the controlled resource server to limit the number of times a token can be successfully presented. The token tests, e.g., steps 340 to 350, are optional and can be completed in any order. Some implementations may not perform any of the tests. Some implementations may perform additional tests. It is understood that process 300 may be repeated concurrently for a plurality of different client devices and different recognized locations. It is also understood that in some implementations, certain steps described as performed by the access server may be performed by the controlled resource server. Thus, implementations are not limited to the exact configuration represented by FIG. 3.

FIG. 4 shows an example of a generic computer device 400, which may be operated as server 110, server 160, server 180, and/or client device 170 of FIG. 1A, which may be used with the techniques described here. Computing device 400 is intended to represent various example forms of computing devices, such as laptops, desktops, workstations, personal digital assistants, cellular telephones, smartphones, tablets, servers, and other computing devices, including wearable devices. The components shown here, their connections and relationships, and their functions, are meant to be examples only, and are not meant to limit implementations of the inventions described and/or claimed in this document.

Computing device 400 includes a processor 402, memory 404, a storage device 406, and expansion ports 410 connected via an interface 408. In some implementations, computing device 400 may include transceiver 446, communication interface 444, and a GPS (Global Positioning System) receiver module 448, among other components, connected via interface 408. Device 400 may communicate wirelessly through communication interface 444, which may include digital signal processing circuitry where necessary. Each of the components 402, 404, 406, 408, 410, 440, 444, 446, and 448 may be mounted on a common motherboard or in other manners as appropriate.

The processor 402 can process instructions for execution within the computing device 400, including instructions stored in the memory 404 or on the storage device 406 to display graphical information for a GUI on an external input/output device, such as display 416. Display 416 may be a monitor or a flat touchscreen display. In some implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 404 stores information within the computing device 400. In one implementation, the memory 404 is a volatile memory unit or units. In another implementation, the memory 404 is a non-volatile memory unit or units. The memory 404 may also be another form of computer-readable medium, such as a magnetic or optical disk. In some implementations, the memory 404 may include expansion memory provided through an expansion interface.

The storage device 406 is capable of providing mass storage for the computing device 400. In one implementation, the storage device 406 may be or include a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in such a computer-readable medium. The computer program product may also include instructions that, when executed, perform one or more methods, such as those described above. The computer- or machine-readable medium is a storage device such as the memory 404, the storage device 406, or memory on processor 402.

The interface 408 may be a high speed controller that manages bandwidth-intensive operations for the computing device 400 or a low speed controller that manages lower bandwidth-intensive operations, or a combination of such controllers. An external interface 440 may be provided so as to enable near area communication of device 400 with other devices. In some implementations, controller 408 may be coupled to storage device 406 and expansion port 414. The expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 430, or multiple times in a group of such servers. It may also be implemented as part of a rack server system. In addition, it may be implemented in a computing device, such as a laptop computer 432, personal computer 434, or tablet/smart phone 436. An entire system may be made up of multiple computing devices 400 communicating with each other. Other configurations are possible.

FIG. 5 shows an example of a generic computer device 500, which may be server 110, server 160, or server 180 of FIG. 1A, which may be used with the techniques described here. Computing device 500 is intended to represent various example forms of large-scale data processing devices, such as servers, blade servers, datacenters, mainframes, and other large-scale computing devices. Computing device 500 may be a distributed system having multiple processors, possibly including network attached storage nodes, that are interconnected by one or more communication networks. The components shown here, their connections and relationships, and their functions, are meant to be examples only, and are not meant to limit implementations of the inventions described and/or claimed in this document.

Distributed computing system 500 may include any number of computing devices 580. Computing devices 580 may include a server or rack servers, mainframes, etc. communicating over a local or wide-area network, dedicated optical links, modems, bridges, routers, switches, wired or wireless networks, etc.

In some implementations, each computing device may include multiple racks. For example, computing device 580a includes multiple racks 558a-558n. Each rack may include one or more processors, such as processors 552a-552n and 562a-562n. The processors may include data processors, network attached storage devices, and other computer controlled devices. In some implementations, one processor may operate as a master processor and control the scheduling and data distribution tasks. Processors may be interconnected through one or more rack switches 558, and one or more racks may be connected through switch 578. Switch 578 may handle communications between multiple connected computing devices 500.

Each rack may include memory, such as memory 554 and memory 564, and storage, such as 556 and 566. Storage 556 and 566 may provide mass storage and may include volatile or non-volatile storage, such as network-attached disks, floppy disks, hard disks, optical disks, tapes, flash memory or other similar solid state memory devices, or an array of devices, including devices in a storage area network or other configurations. Storage 556 or 566 may be shared between multiple processors, multiple racks, or multiple computing devices and may include a computer-readable medium storing instructions executable by one or more of the processors. Memory 554 and 564 may include, e.g., volatile memory unit or units, a non-volatile memory unit or units, and/or other forms of computer-readable media, such as a magnetic or optical disks, flash memory, cache, Random Access Memory (RAM), Read Only Memory (ROM), and combinations thereof. Memory, such as memory 554 may also be shared between processors 552a-552n. Data structures, such as an index, may be stored, for example, across storage 556 and memory 554. Computing device 500 may include other components not shown, such as controllers, buses, input/output devices, communications modules, etc.

An entire system, such as system 100, 100', or 100" may be made up of multiple computing devices 500 communicating with each other. For example, device 580a may communicate with devices 580b, 580c, and 580d, and these may collectively be known as server 110, server 160, or server 180. As another example, system 100 of FIG. 1 may include one or more computing devices 500. Some of the computing devices may be located geographically close to each other, and others may be located geographically distant. The layout of system 500 is an example only and the system may take on other layouts or configurations.

According to certain aspects of the disclosure, a method includes receiving a request for a controlled access resource from a client device, the request including a client device identifier, determining that the request is not associated with a recognized location, identifying state data for the client device identifier. generating a link for accessing the controlled access resource at a server, generating an encrypted token, the encrypted token including a timestamp, a random number, and licensed resource information from the state data, including the encrypted token in the link, and providing the link to the client device, the client device using the link to request the controlled access resource.

This and other aspects can include one or more of the following features, alone or in combination. For example, the request may be a first request and the controlled access resource is a first controlled access resource and prior to receiving the first request the method further includes receiving a second request for a second controlled access resource from the client device, the second request including the client device identifier, determining that the second request is associated with a recognized location, generating the state data for the client device, and storing the state data in a memory. As another example, the state data may include a time stamp, the client device identifier, and licensed resource information. As another example, the licensed resource information may represent the recognized location. In some implementations, the licensed resource information represents the recognized location and controlled resources available to the recognized location. As another example, the recognized location may be a domain name, a geolocation, and/or an Internet Protocol (IP) address. As another example, the request may be a query and the controlled access resource is a resource responsive to the query. As another example, the client device identifier may be a user account. As another example, the client device using the link to request the controlled access resource may include, at a controlled resource server, receiving the link in a request for the controlled access resource, identifying the token in the link, decrypting the token, verifying the token by determining that the token has not expired based on the timestamp and determining that the controlled access resource is available based on the licensed resource information, and providing the controlled access resource to the client device responsive to the token being verified.

According to certain aspects of the disclosure, a system includes at least one processor, a datastore storing state data records for client devices, and memory storing instructions that, when executed by the at least one processor, cause the system to perform operations. The operations include receiving a query from a client device, the client device having a device identifier, and determining that at least one resource responsive to the query is a controlled access resource. In response to determining that the query is associated with a recognized location for the controlled access resource the operations include generating a link to the controlled access resource and generating a state data record for the client device in the datastore, the state data including the client device identifier, a timestamp, and an association with the recognized location. In response to determining that the query is not associated with a recognized location, the operations include identifying an unexpired state data record in the datastore for the client device identifier and, in response to identifying the unexpired state data record, generating a token and including the token in a link to the controlled access resource, the token including a random number, a timestamp, and licensed resource information from the state data record. In response to failing to identify the state data record in the datastore for the client device identifier, generating a link without the token, and returning a search result for the query to the client device, the search result including the link to the resource, wherein the client device uses the link to the resource to request the resource from a controlled access server, the controlled access server configured to provide access to resources from requests associated with recognized locations.

These and other aspects can include one or more of the following features, alone or in combination. For example, in providing access to resources from requests associated with recognized locations the controlled access server is configured to receive a link to a controlled access resource from a particular client device, the link having an associated location, determine whether the location is a recognized location, in response to determining that the location is a recognized location, provide the controlled access resource, and in response to determining that the location is not a recognized location and the link includes an unexpired token provide the controlled access resource, and in response to determining that the location is not a recognized location and the link lacks a token or that a token included in the link has expired denying access to the controlled access resource. In some implementations, the token further includes an IP subnet of an IP address for the request and the controlled access server is further configured to, in response to determining that the location is not a recognized location and the link includes an unexpired token, determine whether an IP subnet of the particular client device matches the IP subnet in the token and in response to determining that the IP subnet does not match, deny access to the controlled access resource. As another example, the recognized location may represent a geolocation and/or an IP address. As another example, the token is encrypted before inclusion into the link.

According to certain aspects of the disclosure, a method includes receiving a request for a controlled access resource from a client device, the request having a location, determining that the location is not a recognized location, determining that the request includes a token, the token including a timestamp, a random number, and licensed resource information, determining that the token is not expired based on the timestamp, determining that a resource identified by the licensed resource information matches the requested resource, and providing the controlled access resource to the client device, wherein the client device would otherwise be denied access to the controlled access resource.

These and other aspects can include one or more of the following features, alone or in combination. For example, the token may be encrypted and the method further includes decrypting the token. As another example, the token may further include an IP subnet and the method further includes determining that an IP address for the client device has an IP subnet that matches the IP subnet included in the token. As another example, the method may further include incrementing a counter for the token, the token being identified by the random number; and determining that the counter for the token has not reached a threshold.

Various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any non-transitory computer program product, apparatus and/or device (e.g., magnetic discs, optical disks, memory (including Read Access Memory), Programmable Logic Devices (PLDs)) used to provide machine instructions and/or data to a programmable processor.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, various modifications may be made without departing from the spirit and scope of the invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method comprising:
    receiving, via a first network connection, a request for a controlled access resource from a client device, the request including a client device identifier but excluding login credentials;
    determining that the request is not associated with a recognized location; and
    in response to determining that the request is not associated with a recognized location:
        identifying state data for the client device identifier,
        generating a link for accessing the controlled access resource at a server,
        generating an encrypted token, the encrypted token including a token timestamp, a random number, and licensed resource information from the state data, wherein the licensed resource information identifies controlled resources available to the client device via the recognized location,
        including the encrypted token in the link, and
        providing, via the first network connection, the link to the client device, the link configured to be used by the client device to request the controlled access resource.

2. The method of claim 1, wherein the request is a first request and the controlled access resource is a first controlled access resource and prior to receiving the first request the method further comprises:
    receiving a second request for a second controlled access resource from the client device, the second request including the client device identifier;
    determining that the second request is associated with a recognized location; and
    in response to determining that the second request is associated with a recognized location:
        generating the state data for the client device, and
        storing the state data in a memory.

3. The method of claim 1, wherein the state data includes a state-data timestamp, the client device identifier, and the licensed resource information.

4. The method of claim 1, wherein the licensed resource information represents a geo location.

5. The method of claim 1, wherein the recognized location is a domain name.

6. The method of claim 1, wherein the recognized location is an Internet Protocol (IP) address.

7. The method of claim 1, wherein the request is a query and the controlled access resource is a resource responsive to the query.

8. The method of claim 1, wherein the client device identifier is a user account.

9. The method of claim 1, further comprising the client device using the link to request the controlled access resource, wherein using the link comprises sending the link in a request to a controlled resource server.

10. The method of claim 9, at the controlled resource server:
    receiving the link in a request for the controlled access resource;
    identifying the encrypted token in the link;
    decrypting the encrypted token;
    verifying the decrypted token by determining that the decrypted token has not expired based on the token timestamp and determining that the controlled access resource is available based on the licensed resource information; and
    providing the controlled access resource to the client device responsive to the decrypted token being verified.

11. The method of claim 10, wherein verifying the decrypted token further comprises determining that an IP subnet contained within the decrypted token matches an IP subnet of an IP address from which the request was received.

12. A system comprising:
    at least one processor;
    a datastore storing state data records for client devices; and
    memory storing instructions that, when executed by the at least one processor, cause the system to perform operations including:
        receiving a query from a client device, the client device having a device identifier,
        determining that at least one resource responsive to the query is a controlled access resource,
        in response to determining that the query is associated with a recognized location for the controlled access resource:

generating a link to the controlled access resource, and generating a state data record for the client device in the datastore, the state data record including the client device identifier, a state data timestamp, and licensed resource information for the recognized location, in response to determining that the query is not associated with a recognized location:

identifying an unexpired state data record in the datastore for the client device identifier, in response to identifying the unexpired state data record, generating a link to the controlled access resource that includes a token, the token including a random number, a token timestamp, and licensed resource information, the licensed resource information being obtained from the unexpired state data record, and in response to failing to identify an unexpired state data record in the datastore for the client device identifier, generating the link without the token, and returning a search result for the query to the client device, the search result including the link to the resource, wherein the client device uses the link to request the at least one resource from a controlled access server, the controlled access server configured to provide access to resources from requests associated with recognized locations.

13. The system of claim 12, wherein in providing access to resources from requests associated with recognized locations the controlled access server is configured to:

receive a link to a controlled access resource from a particular client device, the link having an associated location;

determine whether the associated location is a recognized location;

in response to determining that the associated location is a recognized location, provide the controlled access resource; and in response to determining that the associated location is not a recognized location:

in response to determining that the link includes an unexpired token; provide the controlled access resource, and in response to determining that the link lacks a token or that a token included in the link has expired, denying access to the controlled access resource.

14. The system of claim 13, wherein the token further includes an IP subnet of an IP address and the controlled access server is further configured to, in response to determining that the associated location is not a recognized location and the link includes an unexpired token:

determine whether an IP subnet of the particular client device matches the IP subnet in the token; and in response to determining that the IP subnet does not match, deny access to the controlled access resource.

15. The system of claim 12, wherein the recognized location represents a geolocation.

16. The system of claim 12, wherein the recognized location is an IP address.

17. The system of claim 12, wherein the token is encrypted before inclusion into the link.

18. A method comprising:

receiving, via a first network connection, a request for a controlled access resource from a client device, the request having a location but excluding login credentials;

determining that the location is not a recognized location;

in response to determining that the location is not a recognized location and that the request received via the first network connection includes a token, the token including a token timestamp, a random number, and licensed resource information:

determining that the token is not expired based on the token timestamp, determining that a resource accessible using the licensed resource information matches the requested controlled access resource, and providing, via the first network connection, the controlled access resource to the client device; and in response to determining that the location is not a recognized location and that the request received via the first network connection lacks a token, providing, via the first network connection, a denial of access to the controlled access resource.

19. The method of claim 18, wherein the token is encrypted and the method further includes decrypting the token.

20. The method of claim 18, wherein the token further includes an IP subnet and the method further includes determining that an IP address for the client device has an IP subnet that matches the IP subnet included in the token.

21. The method of claim 18, the method further including:

incrementing a counter for the token, the token being identified by the random number; and determining that the counter for the token has not reached a threshold.

22. The method of claim 18, the method further including:

incrementing a counter for the token, the token being identified by the random number;

determining that the counter for the token has reached a threshold; and in response to determining that the counter for the token has reached the threshold, providing, via the first network connection, a denial of access to the controlled access resource.

* * * * *